United States Patent
Vuong

(10) Patent No.: US 9,656,768 B2
(45) Date of Patent: May 23, 2017

(54) FLYING BOOSTER SYSTEM

(71) Applicant: Anh Vuong, Garland, TX (US)

(72) Inventor: Anh Vuong, Garland, TX (US)

(*) Notice: Subject to any disclaimer, the term of this patent is extended or adjusted under 35 U.S.C. 154(b) by 228 days.

(21) Appl. No.: 15/069,465

(22) Filed: Mar. 14, 2016

(65) Prior Publication Data

US 2016/0264263 A1  Sep. 15, 2016

Related U.S. Application Data

(60) Provisional application No. 62/133,111, filed on Mar. 13, 2015.

(51) Int. Cl.
| | | |
|---|---|---|
| *B64C 37/02* | (2006.01) | |
| *B64G 1/00* | (2006.01) | |
| *B64G 1/14* | (2006.01) | |
| *B64C 1/26* | (2006.01) | |
| *B64G 1/60* | (2006.01) | |
| *B64D 5/00* | (2006.01) | |

(52) U.S. Cl.
CPC ............ *B64G 1/005* (2013.01); *B64C 1/26* (2013.01); *B64D 5/00* (2013.01); *B64G 1/14* (2013.01); *B64G 1/60* (2013.01)

(58) Field of Classification Search
CPC .......... B64G 1/002; B64G 1/005; B64C 1/26; B64D 5/00
USPC .......................................................... 244/2
See application file for complete search history.

(56) References Cited

U.S. PATENT DOCUMENTS

| | | | | |
|---|---|---|---|---|
| 3,003,717 A | * | 10/1961 | Booker | B64D 5/00 244/114 R |
| 4,802,639 A | * | 2/1989 | Hardy | B64C 37/02 244/137.4 |
| 5,402,965 A | * | 4/1995 | Cervisi | B64G 1/005 244/159.3 |
| 8,403,254 B2 | * | 3/2013 | Ustinov | B64D 5/00 244/158.9 |
| 2015/0021428 A1 | * | 1/2015 | Rutan | B64G 1/005 244/3 |
| 2015/0353197 A1 | * | 12/2015 | Alber | B64D 5/00 244/2 |

* cited by examiner

*Primary Examiner* — Richard G Davis

(57) ABSTRACT

An orbiter launch system for sending a spacecraft into orbit from the upper atmosphere. An orbiter launch assembly is connected to a launch system transporter, wherein the launch system transporter provides lift surfaces for shuttling the orbiter launch assembly and a space orbiter into the upper atmosphere. The space orbiter is slidably engaged with a plurality of stabilization rails of the orbiter launch assembly, wherein the plurality of stabilization rails guides the space orbiter along the orbiter launch assembly when the space orbiter is launched from the launch system transporter. A launching trough funnels exhaust and serves as a heat shield to protect the launch system transporter when the space orbiter is launched. The space orbiter is loaded onto the orbiter launch assembly upside down, wherein a plurality of reversible seats allows passengers to remain sitting upright.

15 Claims, 11 Drawing Sheets

FLYING BOOSTER SYSTEM

The current application claims a priority to the U.S. Provisional Patent application Ser. No. 62/133,111 filed on Mar. 13, 2015.

FIELD OF THE INVENTION

The present invention relates generally to orbital launch systems. More specifically, the present invention provides a launch system transporter for launching a space orbiter in mid-air.

BACKGROUND OF THE INVENTION

Launching spacecraft into orbit is an expensive process due to the large amounts of fuel required to generate sufficient thrust. To lift such a large mass, massive amounts of energy is needed, hence a large amount of fuel or rocket propellant. Additionally, most spacecraft launches utilize detachable boosters that carry the spacecraft to a certain altitude before detaching. These detachable boosters then enter freefall and must be collected a refurbished before being used again. Often times the detachable boosters are released over a body of water in order to prevent injury to civilians. However, this can lead to a troublesome process of locating the detachable boosters and retrieving the detachable boosters from the body of water. Ideally a self-guided system would be utilized to launch a spacecraft, wherein the self-guided system would return to earth in a controlled manner.

Therefore, it is the object of the present invention to provide a orbiter launch assembly that is connected to a launch system transporter and is used to launch a space orbiter in mid-air. The orbiter launch assembly securely carries the space orbiter during the flight into the upper atmosphere and provides a track system that guides the space orbiter in a straight path during launch. The launch system transporter provides the lift surfaces and control systems for taking off, attaining the desired altitude, and landing after the space orbiter has been launched. Additionally, a booster rocket is connected to the orbiter launch assembly and provides thrust during flight in addition to the thrust produced from a plurality of engines of the launch system transporter. The space orbiter is loaded onto the orbiter launch assembly upside down, wherein a plurality of reversible seats allows passengers to remain upright during the flight into the upper atmosphere. During launch, a launching trough funnels the exhaust from the space orbiter and provides a heat shield to protect the launch system transporter.

DETAIL DESCRIPTIONS OF THE INVENTION

Figure 1:
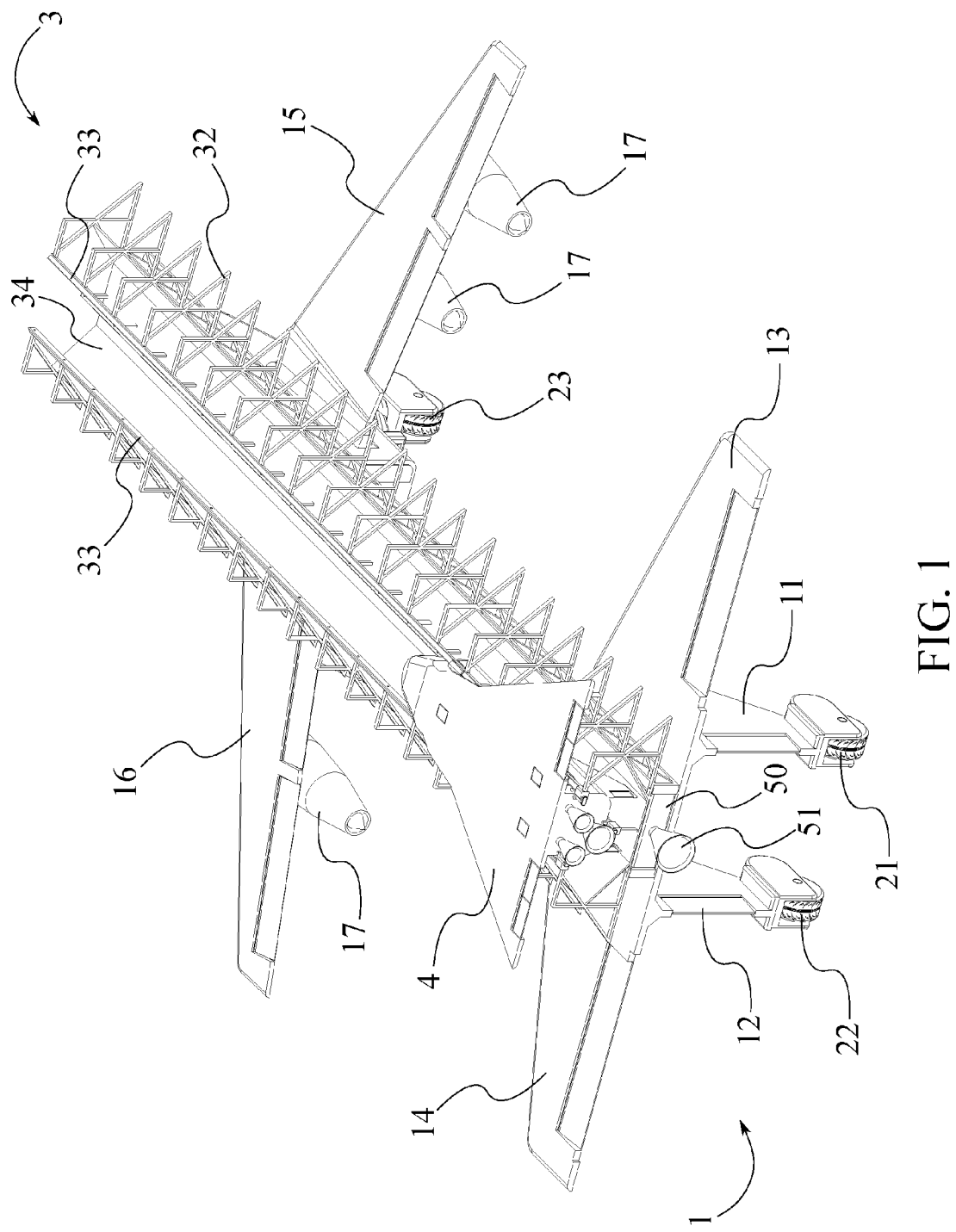
FIG. 1 is a perspective view of the present invention, wherein the space orbiter is loaded onto the orbiter launch assembly.

All illustrations of the drawings are for the purpose of describing selected versions of the present invention and are not intended to limit the scope of the present invention.

The present invention is an orbiter launch system for sending a spacecraft into orbit from the upper atmosphere. In reference to FIG. 1, the present invention comprises a launch system transporter 1, an orbiter launch assembly 3, a booster rocket 5, and a space orbiter 4. The launch system transporter 1 provides a means for carrying the space orbiter 4 into the upper atmosphere with assistance from the booster rocket 5, wherein the space orbiter 4 is launched into orbit from the launch system transporter 1. Meanwhile, the orbiter launch assembly 3 provides a means for securing the space orbiter 4 to the launch system transporter 1 and guiding the space orbiter 4 along the launch system transporter 1.

It is an object of the present invention to provide a reusable launching vehicle (i.e. the launch system transporter 1) that removes the need for spacecraft to use bulky external rockets to gain the sufficient altitude and speed required to enter into an orbiting flight path. As such, the launch system transporter 1 is able to take off and land by taxiing along a runway. Additionally, the booster rocket 5, which is activated in mid-air to increase speed and provide the appropriate thrust required to launch the space orbiter 4, remains connected to the launch system transporter 1, such that the booster rocket 5 does not need to be revered. The present invention enables space programs to launch multiple spacecraft without having to discard or retrieve jettisoned components. In the preferred embodiment of the present invention, the space orbiter 4 is a spacecraft similar to the space shuttle, however, the space orbiter 4 can be any type of spacecraft.

Figure 3:
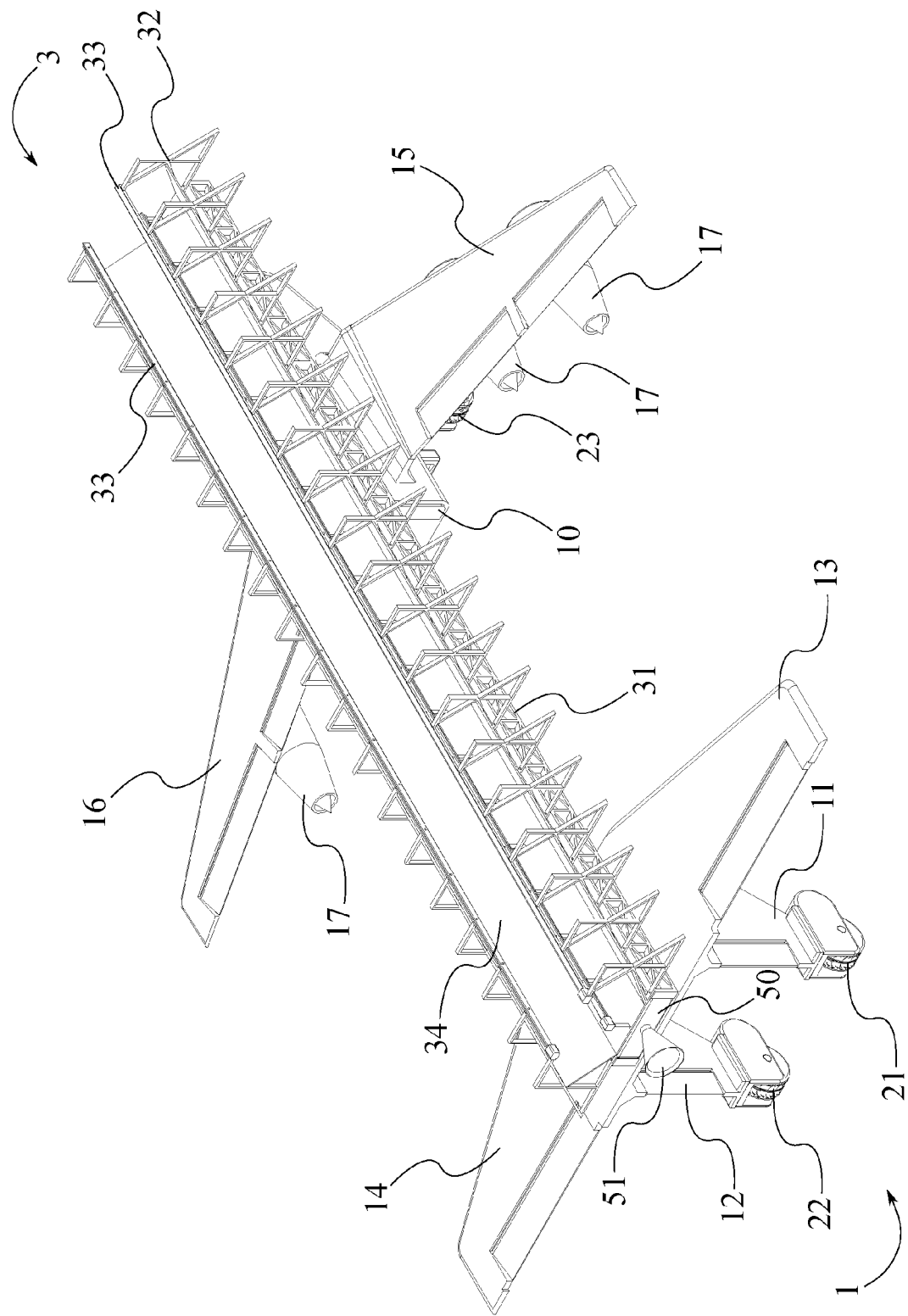
FIG. 3 is a perspective view of the launch system transporter and the orbiter launch assembly.

In reference to FIG. 1 and FIG. 3, the orbiter launch assembly 3 connects the space orbiter 4 to the launch system transporter 1, wherein the orbiter launch assembly 3 provides a sufficiently long runway from which the space orbiter 4 can be launched. The orbiter launch assembly 3 comprises an orbiter support structure 30 and a launching trough 34. It is an object of the orbiter launch assembly 3 to provide a guide system for launching the space orbiter 4 from the launch system transporter 1, while dampening the recoil caused by launching the space orbiter 4. Additionally, the orbiter launch assembly 3 provides a connecting body between sections of the launch system transporter 1.

In further reference to FIG. 1 and FIG. 3, the orbiter support structure 30 is an elongated framework that provides the body of the orbiter launch assembly 3, wherein the orbiter support structure 30 defines the effective runway length for launching the space orbiter 4. The space orbiter 4 is slidably engaged with the orbiter support structure 30, while the launch system transporter 1 is connected to the bottom of the orbiter support structure 30, such that the space orbiter 4 is launched above the launch system transporter 1. The orbiter support structure 30 comprises a main support truss 31, an orbiter support frame 32, and a plurality of stabilization rails 33 that function to support and guide the space orbiter 4 as the space orbiter 4 is launched from the launch system transporter 1.

Figure 5:
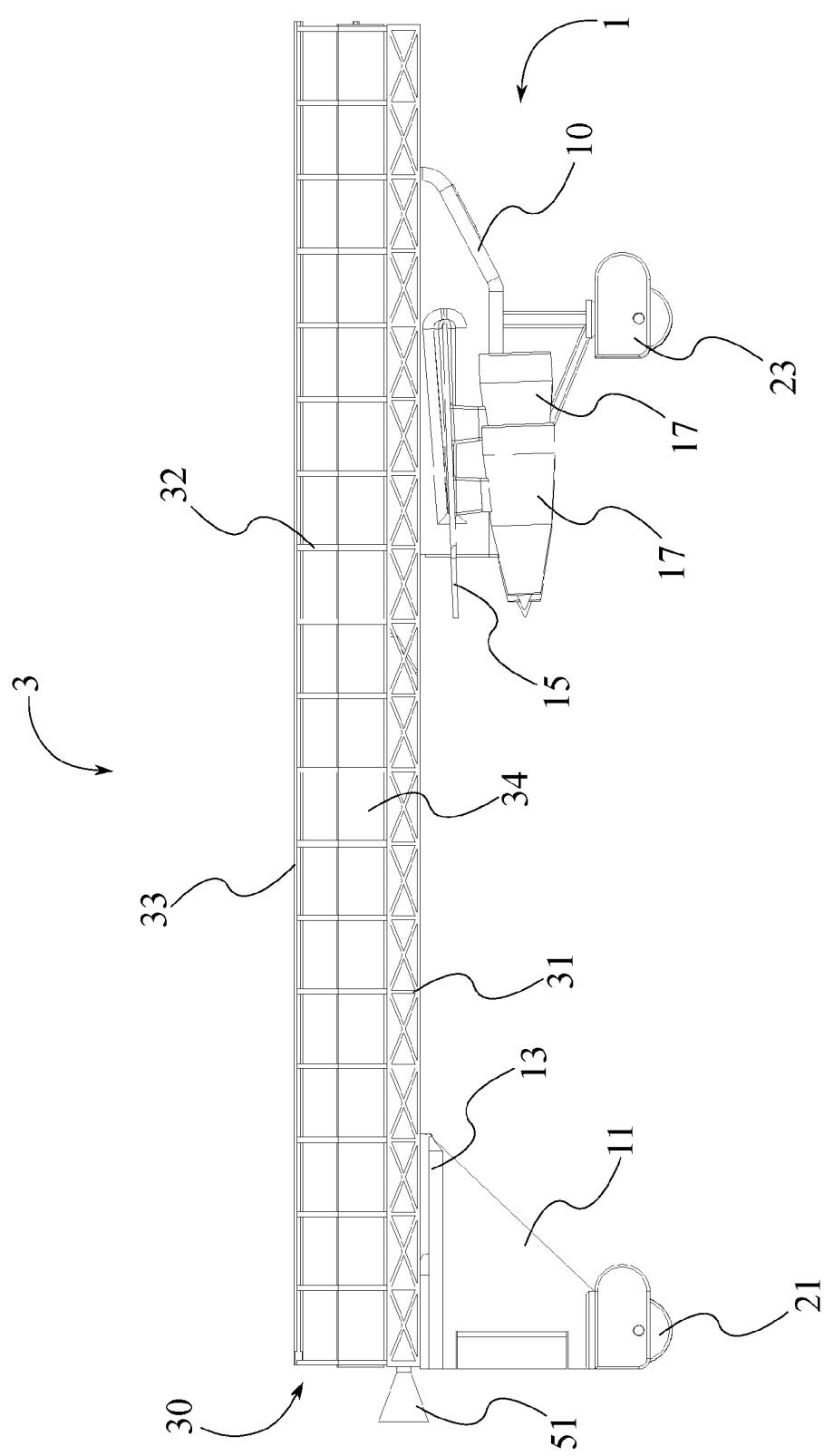
FIG. 5 is a right side elevational view of the launch system transporter and the orbiter launch assembly.

In reference to FIG. 5, the main support truss 31 is a rigid frame that connects sections of the launch system transporter 1 and provides a foundation for the orbiter support frame 32. As such, the orbiter support frame 32 is adjacently connected to the main support truss 31, wherein the orbiter support frame 32 is positioned along the main support truss 31. The orbiter support frame 32 includes a plurality of beam structures that supports the plurality of stabilization rails 33 and in turn the space orbiter 4. The plurality of beam structures is spaced along the main support truss 31, with each of the plurality of beam structures providing a plurality of mounting points for connecting the plurality of stabilization rails 33. In the preferred embodiment of the present invention, the plurality of mounting points and the plurality of stabilization rails 33 is three, wherein the space orbiter 4 is supported on three sides.

Figure 4:
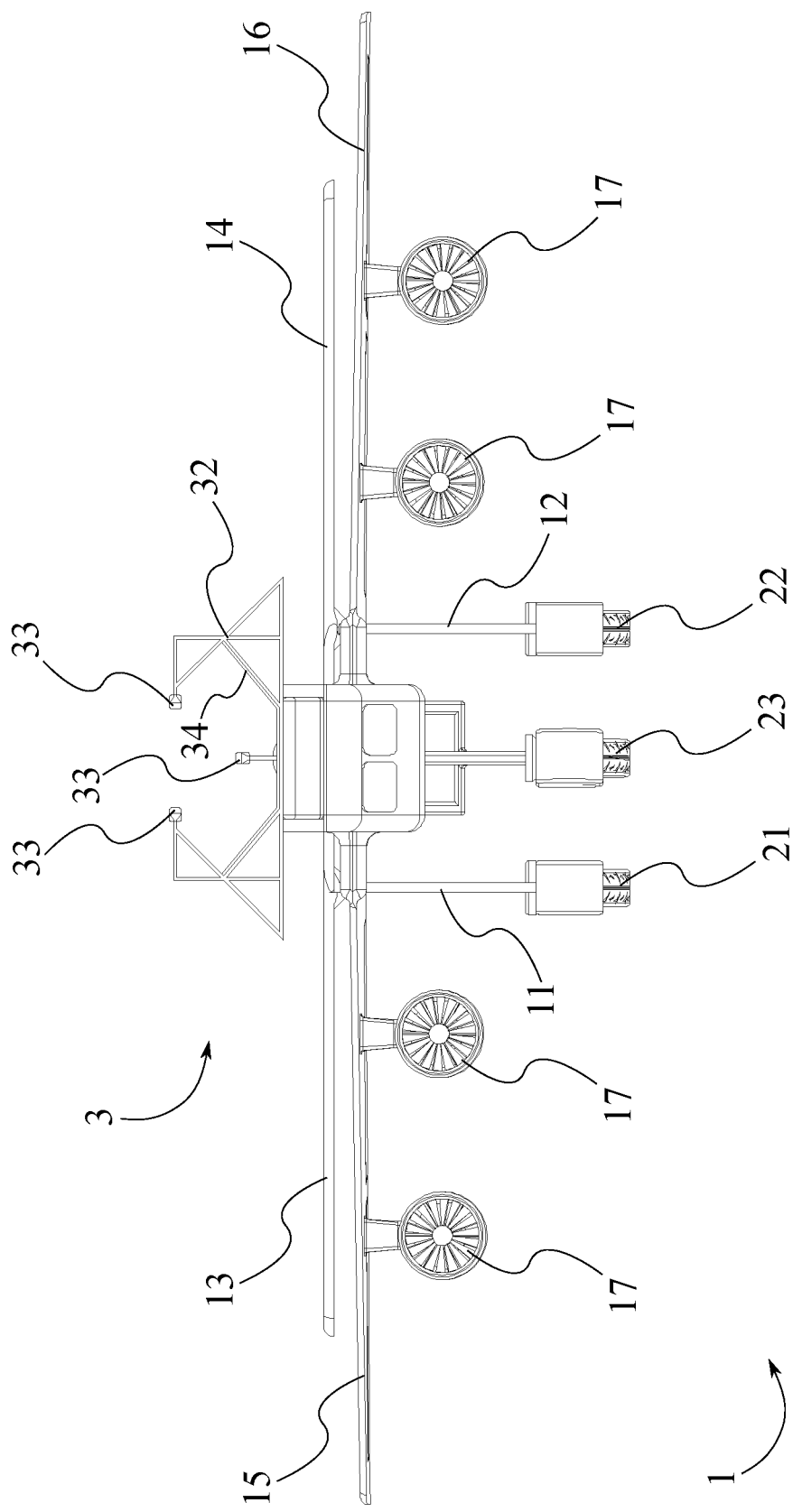
FIG. 4 is a front elevational view of the launch system transporter and the orbiter launch assembly.

In reference to FIG. 4-5, each of the plurality of stabilization rails 33 is adjacently connected to the orbiter frame; more specifically, each of the plurality of stabilization rails 33 is connected to each of the plurality of beam structures about one of the plurality of mounting points. Each of the plurality of stabilization rails 33 is positioned along the orbiter support frame 32, wherein each of the plurality of stabilization rails 33 provides a continuous, elongated guide along which the space orbiter 4 is directed. In the preferred embodiment of the present invention, each of the plurality of stabilization rails 33 has a triangular cross section, however, it is possible for the plurality of stabilization rails 33 to take any other shape in other embodiments.

It is an object of the orbiter support structure 30 to provide an assembly that distributes the forces generated by transporting and launching the space orbiter 4. To that end, embodiments of the main support truss 31 use arrangements of truss beams that are designed to optimize strength and reduce drag. Similarly, the design and the arrangement of the plurality of beam structures of the orbiter support frame 32 are optimized for strength and reduced drag. The orbiter support structure 30 may further comprise a recoil absorption system that is integrated with any of the main support truss 31, the orbiter support frame 32, or the plurality of stabilization rails 33. In this way, the launch system transporter 1 is able to maintain a viable flight path before, during, and after the launch of the space orbiter 4. In one embodiment, the recoil absorption system uses a series of dampening mechanisms to absorb any recoil created by launching the space orbiter 4.

In reference to FIG. 4-5, the launching trough 34 is a concave section of rigid material with a smooth interior surface that is contoured around the space orbiter 4. The launching trough 34 is positioned along the orbiter support structure 30, wherein the launching trough 34 is positioned within the orbiter support frame 32. In the preferred embodiment of the present invention, the launching trough 34 is adjacently connected to the orbiter support frame 32; more specifically, the launching trough 34 is connected to each of the plurality of beam structures. However, it is possible for the launching trough 34 to be connected to the main support truss 31 instead of or in addition to the orbiter support frame 32. The launching trough 34 comprises truss fasteners by which the launching trough 34 is attached to the orbiter support structure 30.

The launching trough 34 serves to funnel exhaust from the space orbiter 4 when the space orbiter 4 is launched from the launch system transporter 1. Furthermore, the launching trough 34 provides a heat shield, wherein the launching trough 34 shields the launch system transporter 1 from the extreme heat generated by the rocket propulsion system of the space orbiter 4 during launch. As such, the launching trough 34 is manufactured from materials able to retain the same shape and composition when exposed to high temperatures. In one embodiment, the launching trough 34 is designed such that the launching trough 34 can be removed and replaced. In this way, the launch system transporter 1 can be modified to transport spacecraft of varying shapes and sizes.

Figure 6:
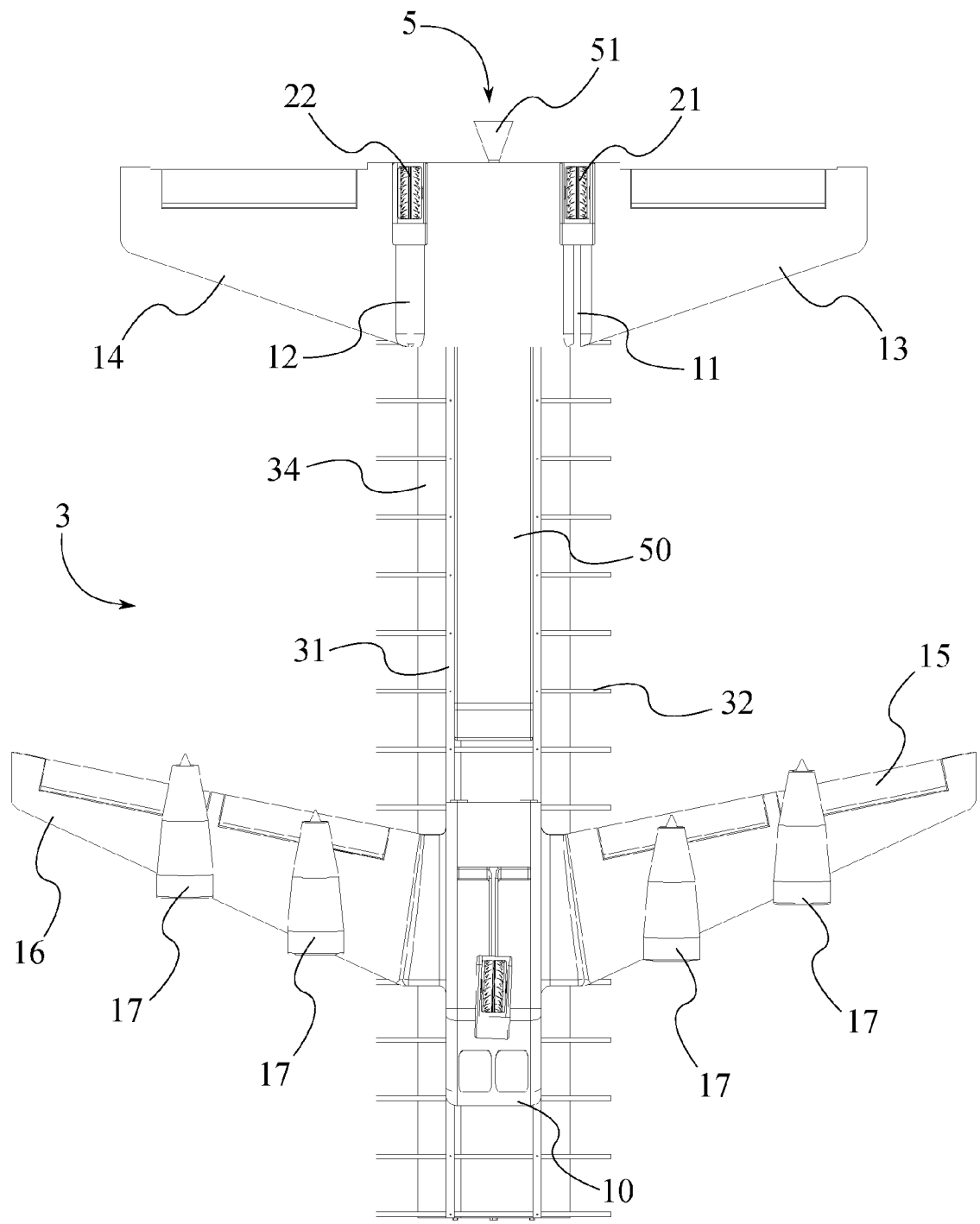
FIG. 6 is a bottom plan view showing the booster rocket positioned within the orbiter support structure.

In reference to FIG. 5-6, the launch system transporter 1 provides lift generating surfaces and other aircraft components, allowing the launch system transporter 1 to take off and land along a runway. As such, the launch system transporter 1 comprises a fuselage 10, a first vertical stabilizer 11, a second vertical stabilizer 12, a first horizontal stabilizer 13, a second horizontal stabilizer 14, a first wing 15, a second wing 16, a plurality of engines 17, a first tailwheel 21, a second tailwheel 22, and a landing gear assembly 23. To efficiently launch the space orbiter 4 out of the atmosphere, the space orbiter 4 must be launched from a certain altitude. As such, the launch system transporter 1 is designed to generate sufficient lift and thrust to carry the space orbiter 4 to the appropriate altitude for the space orbiter 4 to be launched into orbit.

In further reference to FIG. 5-6, the fuselage 10, the first horizontal stabilizer 13, and the second horizontal stabilizer 14 are adjacently connected to the orbiter support structure 30. More specifically, the fuselage 10, the first horizontal stabilizer 13, and the second horizontal stabilizer 14 are adjacently connected to the main support truss 31 opposite the orbiter support frame 32; wherein the launching trough 34 is adjacently connected to the orbiter support structure 30 opposite the fuselage 10, the first vertical stabilizer 11, and the second vertical stabilizer 12. The first horizontal stabilizer 13 and the second horizontal stabilizer 14 are terminally positioned on the orbiter support structure 30 to form the tail end of the launch system transporter 1; the first horizontal stabilizer 13 and the second horizontal stabilizer 14 being positioned opposite each other across the orbiter support structure 30.

In reference to FIG. 4 and FIG. 6, the first vertical stabilizer 11 and the second vertical stabilizer 12 further form the tail end of the launch system transporter 1, wherein the first vertical stabilizer 11 and the first horizontal stabilizer 13 are positioned opposite the second vertical stabilizer 12 and the second horizontal stabilizer 14 across the orbiter support structure 30. The first vertical stabilizer 11 is adjacently connected to the first horizontal stabilizer 13 opposite the orbiter support structure 30. Similarly, the second vertical stabilizer 12 is adjacently connected to the second horizontal stabilizer 14 opposite the orbiter support structure 30. Contrary to traditional aircraft, the first vertical stabilizer 11 and the second vertical stabilizer 12 are directed downwards.

In reference to FIG. 5-6, the fuselage 10 is positioned along the orbiter support structure 30 opposite the first vertical stabilizer 11 and the second vertical stabilizer 12, wherein the first wing 15 and the second wing 16 are adjacently connected to the fuselage 10. The first wing 15 and the second wing 16 are positioned opposite each other across the fuselage 10 and provide lift generating surfaces along with the first horizontal stabilizer and the second horizontal stabilizer 14. Each of the first wing 15 and the second wing 16 include an aileron and flaps for navigating the launch system transporter 1, while the first horizontal stabilizer 13 and the second horizontal stabilizer 14 each include an elevator. Similarly, the first vertical stabilizer 11 and the second vertical stabilizer 12 each include a rudder for controlling yaw maneuvers of the launch system transporter 1.

In reference to FIG. 6, the plurality of engines 17 is adjacently connected to the first wing 15 and the second wing 16, wherein the plurality of engines 17 generates thrust to propel the launch system transporter 1. The plurality of engines 17 provides sufficient thrust to be able to take off with the space orbiter 4 attached to the orbiter support structure 30 and to reach a sufficient altitude for launching the space orbiter 4. In the preferred embodiment of the present invention, the plurality of engines 17 is specifically four engines; two engines on the first wing 15 and two engines on the second wing 16. However, it is possible for any other number of engines to be utilized in other embodiments of the preset invention.

In further reference to FIG. 6, the booster rocket 5 is also used in conjunction with the plurality of engines 17 to obtain a speed suitable for launching the space orbiter 4; the booster rocket 5 is not utilized for take-off. The booster rocket 5 comprises a body tube 50 and a nozzle 51, wherein the body tube 50 houses the rocket propellant and the nozzle 51 directs the thrust generated from the booster rocket 5. The body tube 50 is positioned within the orbiter support structure 30, while the nozzle 51 is terminally connected to the body tube 50 and positioned adjacent to the first vertical stabilizer 11 and the second vertical stabilizer 12 outside of the orbiter support structure 30. The booster rocket 5 remains connected to the orbiter support structure 30 after ignition, such that booster rocket 5 can be reused and does not need to be retrieved after use.

Together the first tailwheel 21, the second tailwheel 22, and the landing gear assembly 23 provide a means for traversing along a runway. In reference to FIG. 3, the first tailwheel 21 is terminally connected to the first vertical stabilizer 11 opposite the orbiter support structure 30, while the second tailwheel 22 is terminally connected to the second vertical stabilizer 12 opposite the orbiter support structure 30. Meanwhile, the landing gear assembly 23 is adjacently connected to the fuselage 10 opposite the orbiter support structure 30, as shown in FIG. 5. Both the first tailwheel 21 and the second tailwheel 22 are fixed in place and comprise a shock absorber that assists in softening the landing of the launch system transporter 1.

It is an object of the present invention to provide a set of landing gear that generates a negligible amount of drag during flight. To that end the landing gear assembly 23 is designed as a semi-retractable or fully retractable component that can be folded up into wheel wells of the fuselage 10. The landing gear assembly 23 comprises a retractable strut and a nosewheel. The retractable strut is pivotally connected to the fuselage 10, while the nosewheel is terminally connected to the retractable strut opposite the fuselage 10. The retractable wheel can be toggled between an extended position and a retracted position, wherein the extended position is utilized for landing and taking off, while the retracted position is used while in flight.

The fuselage 10 comprises a control room and a fuel tank. In the preferred embodiment of the present invention the control room is a cockpit that houses the pilots and control equipment of the launch system transporter 1. Meanwhile, in another embodiment of the present invention, the control room is designed with components that enable the launch system transporter 1 to function as an unmanned system. The fuel tank stores the fuel required to power the plurality of engines 17. In some embodiments, the fuel tank may comprise separate compartments for fueling both the plurality of engines 17 and the booster rocket 5.

The launch system transporter 1 further comprises a control system. The control system enables the launch system transporter 1 to remain in contact with ground based systems, calculate the position of the launch system transporter 1, initiate the launch of the space orbiter 4, and communicate with other aircraft. Furthermore, it is an aim of the present invention to provide a control system that actively monitors environmental conditions, and relays these conditions to pilots and ground based systems.

Figure 2:
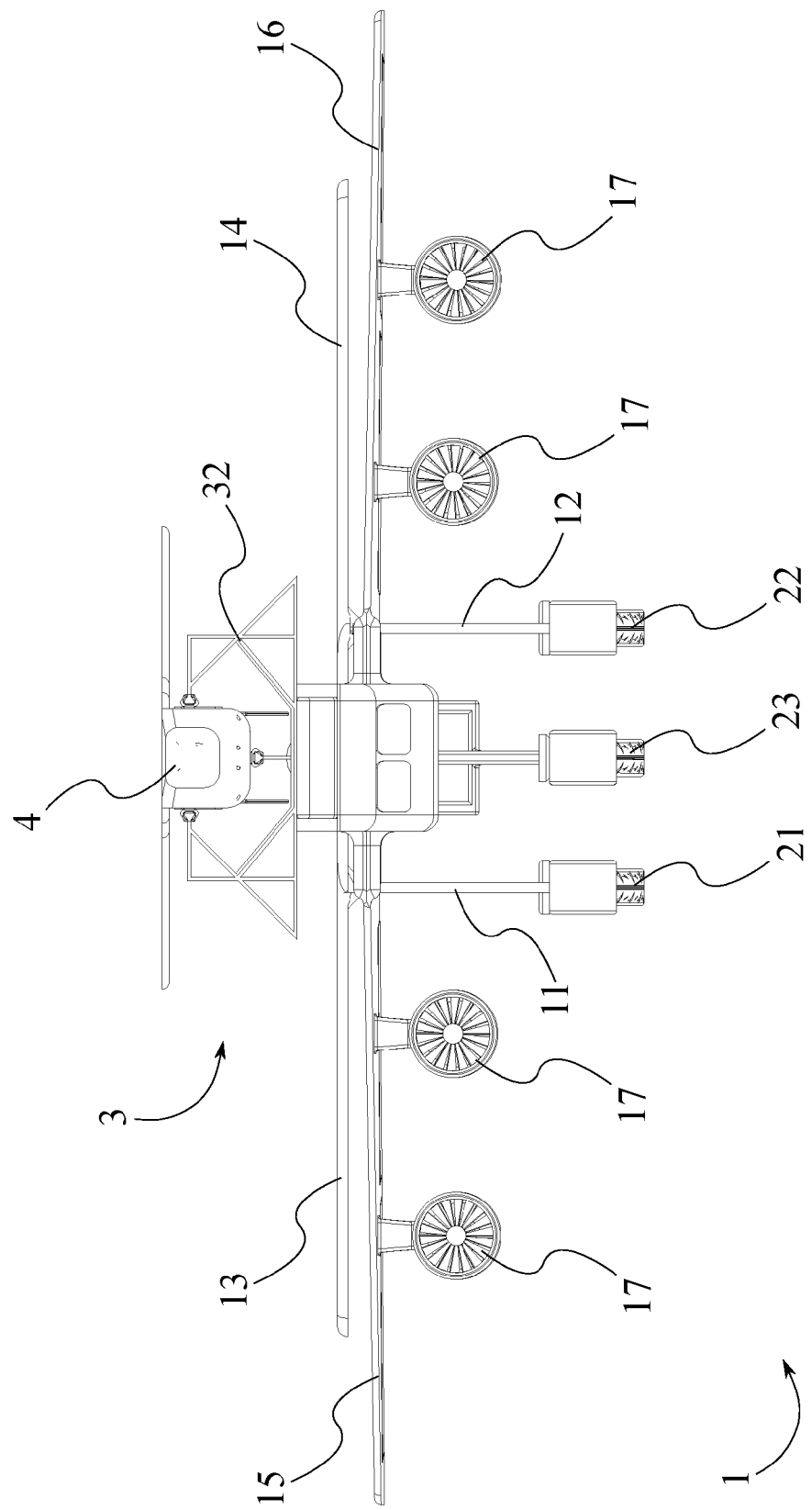
FIG. 2 is a front elevational view of the present invention, wherein the space orbiter is slidably engaged with the plurality of stabilization rails.
Figure 10:
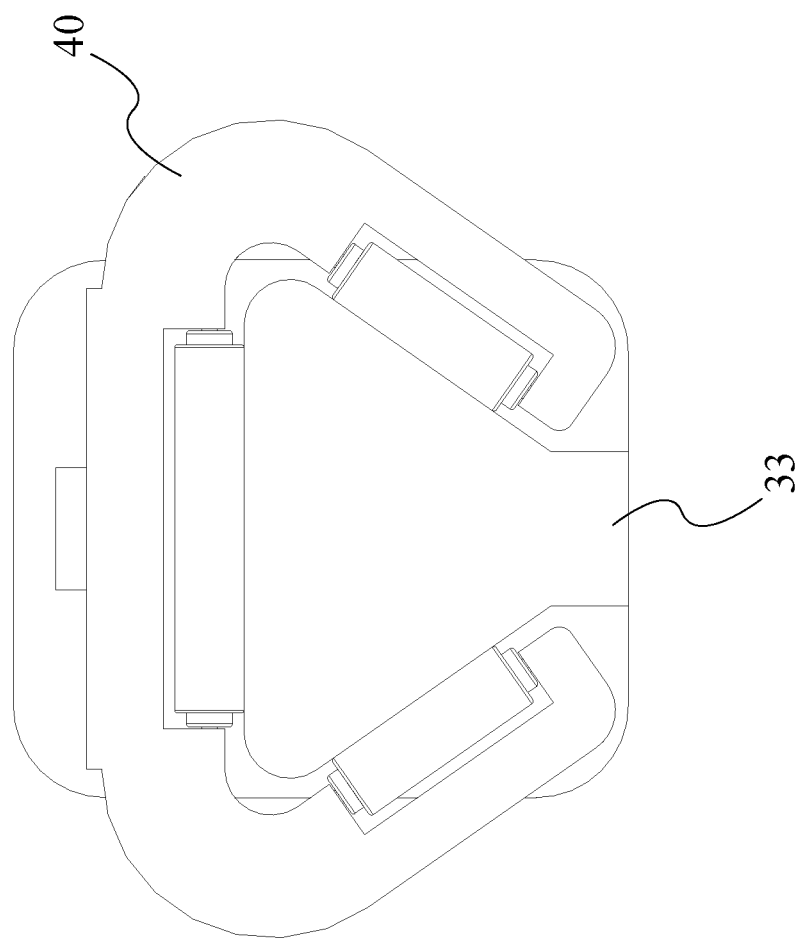
FIG. 10 is a detail view showing one of the plurality of roller blocks being slidably engaged with one of the plurality of stabilization rails.

In reference to FIG. 1-2, the space orbiter 4 is slidably engaged with the orbiter support structure 30, wherein the orbiter space structure guides the space orbiter 4 during the launch of the space orbiter 4. In reference to FIG. 7, the space orbiter 4 comprises a plurality of roller blocks 40 and a plurality of locks 41. The plurality of roller blocks 40 is positioned on the body of the space orbiter 4, wherein the plurality of roller blocks 40 is slidably engaged with the orbiter support structure 30. More specifically, each of the plurality of roller blocks 40 is shaped to receive one of the plurality of stabilization rails 33, wherein the plurality of roller blocks 40 is slidably engaged with the plurality of stabilization rails 33, as shown in FIG. 10. In the preferred embodiment of the present invention, the plurality of roller blocks 40 has three sets of roller blocks; one set on top of the space orbiter 4 and one set on each side of the space orbiter 4, wherein each of the sets has three roller blocks.

Figure 7:
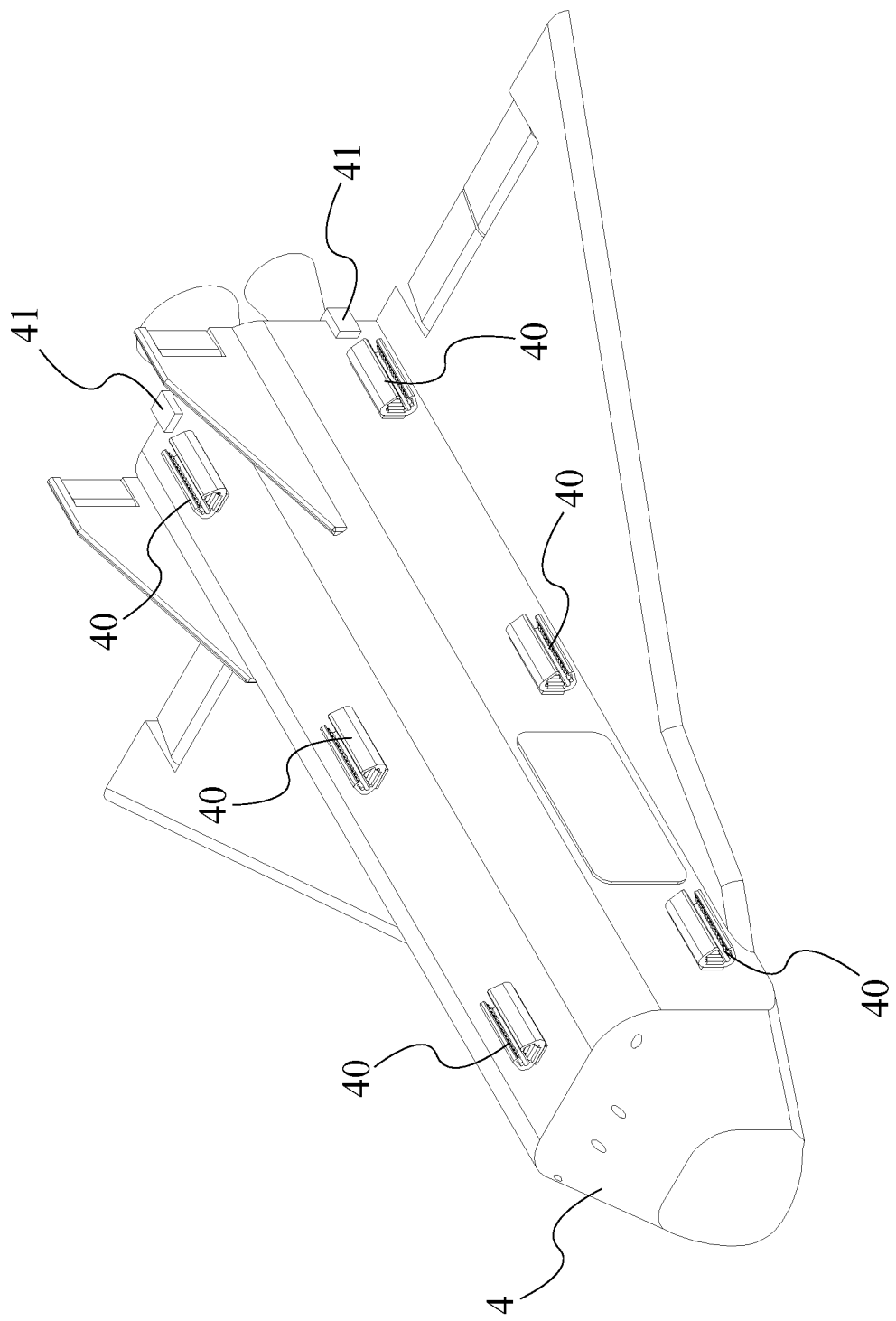
FIG. 7 is a perspective view of the space orbiter showing the plurality of roller blocks and the plurality of locks.
Figure 11:
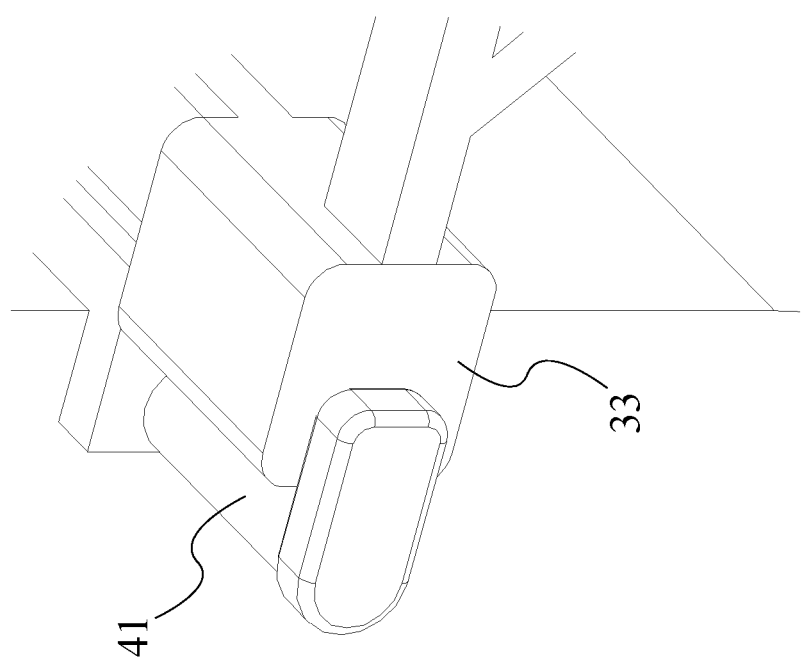
FIG. 11 is a detail view showing one of the plurality of locks being engaged with one of the plurality of stabilization rails.

In reference to FIG. 7, the plurality of locks 41 is positioned on the rear end of the space orbiter 4, adjacent to the engine nozzle of the space orbiter 4. The plurality of locks 41 engages with the orbiter support structure 30 adjacent to the first vertical stabilizer 11 and the second vertical stabilizer 12. More specifically, the plurality of locks 41 is terminally engaged with the plurality of stabilization rails 33, as depicted in FIG. 11. Each of the plurality of stabilization rails 33 comprises a stop that prevents the space orbiter 4 from traversing any further along the orbiter support structure 30. Additionally, the stop of each of the plurality of stabilization rails 33 provides a means for engaging with one of the plurality of locks 41. The plurality of locks 41 acts to retain the position of the space orbiter 4 during lift off and flight of the launch system transporter 1.

Before liftoff, the plurality of roller blocks 40 in aligned with the plurality of stabilization rails 33, and the space orbiter 4 is loaded onto the orbiter support structure 30 adjacent to the fuselage 10. In the preferred embodiment of the present invention, the space orbiter 4 is loaded onto the orbiter support structure 30 upside down. Once loaded onto the orbiter support structure 30, the space orbiter 4 is directed along the plurality of stabilization rails 33 towards the tail end, wherein the plurality of locks 41 is engaged with the stops of the plurality of stabilization rails 33.

With the space orbiter 4 secured to the orbiter support structure 30, the launch system transporter 1 takes off and lifts the space orbiter 4 to the required altitude. Once the required altitude has been reached, the ignition sequence for the space orbiter 4 is initiated, wherein each of the plurality of locks 41 is disengaged and rocket of the space orbiter 4 is ignited. As the rocket of the space orbiter 4 generates thrust, the space orbiter 4 is propelled along the orbiter support structure 30, wherein the plurality of roller blocks 40 ensures that the space orbiter 4 is properly guided along the plurality of stabilization rails 33. The space orbiter 4 then disengages the orbiter support structure 30 and exits the atmosphere, and the launch system transporter 1 then returns to earth.

Figure 8:
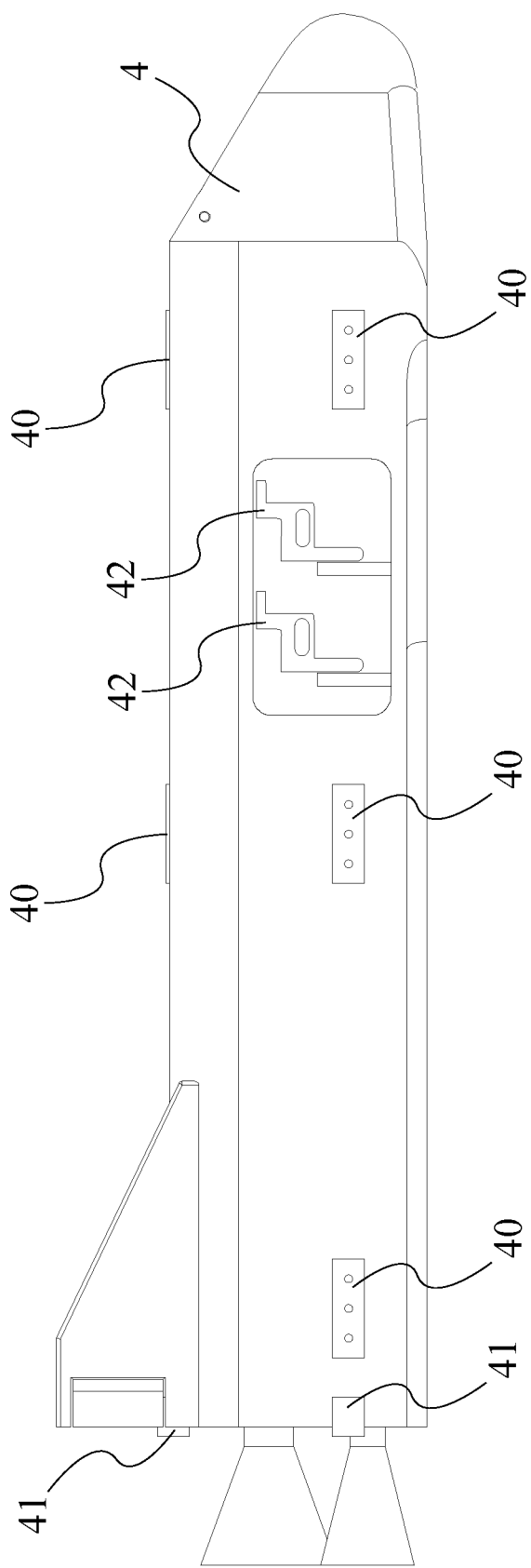
FIG. 8 is a left side elevational view of the space orbiter, wherein the reversible seats is in the first position.
Figure 9:
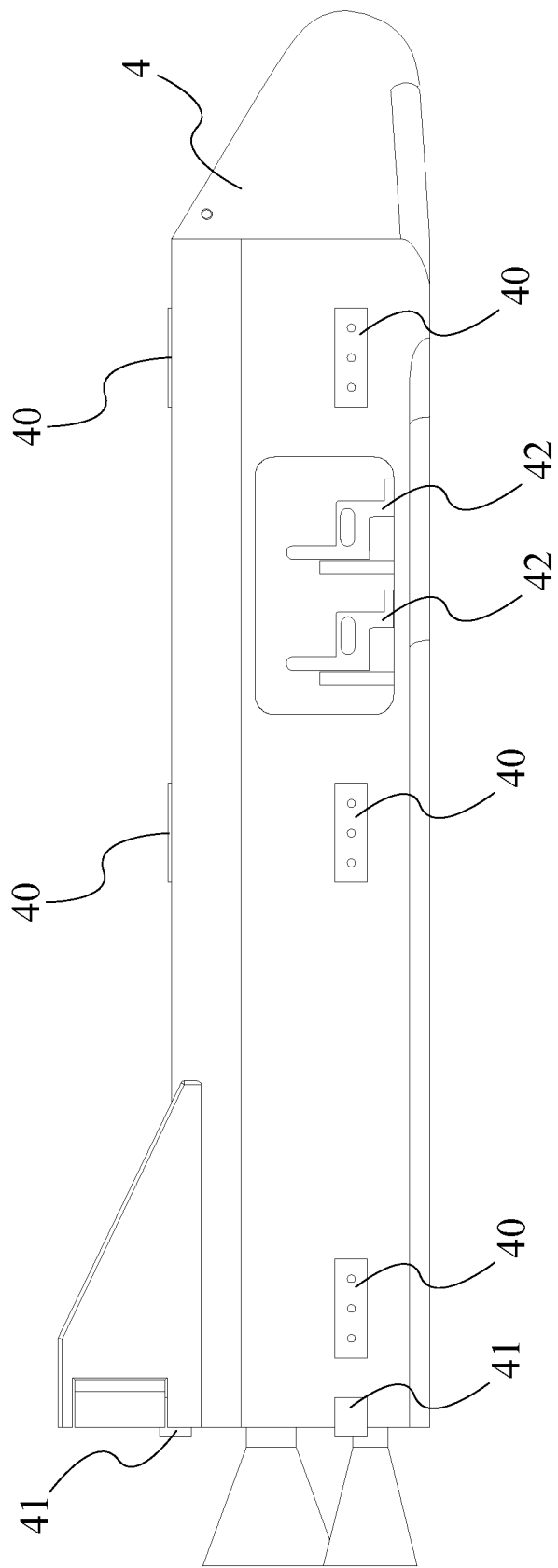
FIG. 9 is a left side elevational view of the space orbiter, wherein the reversible seats is in the second position.

The space orbiter 4 further comprises a plurality of reversible seats 42 that can be toggled between a first position and a second position. When the space orbiter 4 is loaded onto the orbiter support structure 30 upside down, the plurality of reversible seats 42 is in the first position as shown in FIG. 8, wherein an individual sitting in one of the reversible seats is positioned upright, as opposed to upside down. When the space orbiter 4 disengages the orbiter support structure 30, each of the plurality of reversible seats 42 is toggled to the second position as shown in FIG. 9; the second position being 180 degrees from the first position. The reversible seats can be toggled from the first position to the second position either before or after the space orbiter 4 exits the atmosphere.

Although the invention has been explained in relation to its preferred embodiment, it is to be understood that many other possible modifications and variations can be made without departing from the spirit and scope of the invention as hereinafter claimed.

What is claimed is:

1. An orbiter launch system comprises:
a launch system transporter;
an orbiter launch assembly;
the launch system transporter comprising a fuselage, a first vertical stabilizer, a second vertical stabilizer, a first tailwheel, and a second tailwheel;
the orbiter launch assembly comprising an orbiter support structure and a launching trough;
the fuselage being adjacently connected to the orbiter support structure;
the fuselage being positioned along the orbiter support structure opposite the first vertical stabilizer and the second vertical stabilizer;
the first vertical stabilizer and the second vertical stabilizer being positioned opposite each other across the orbiter support structure;
the first tailwheel being terminally connected to the first vertical stabilizer opposite the orbiter support structure;
the second tailwheel being terminally connected to the second vertical stabilizer opposite the orbiter support structure;
the launching trough being adjacently connected to the orbiter support structure opposite the fuselage, the first vertical stabilizer, and the second vertical stabilizer; and
the launching trough being positioned along the orbital support structure.

2. The orbiter launch system as claimed in claim 1 further comprises:
the orbiter support structure comprising a main support truss and an orbiter support frame;
the orbiter support frame being adjacently connected to the main support truss;
the orbiter support frame being positioned along the main support truss; and
the fuselage being adjacently connected to the main support truss opposite the orbiter support frame.

3. The orbiter launch system as claimed in claim 2 further comprises:
the launching trough being positioned within the orbiter support frame.

4. The orbiter launch system as claimed in claim 1 further comprises:
the orbiter support structure comprising an orbiter support frame and a plurality of stabilization rails;
each of the plurality of stabilization rails being adjacently connected to the orbiter support frame; and
each of the plurality of stabilization rails being positioned along the orbiter support frame.

5. The orbiter launch system as claimed in claim 1 further comprises:
the launch system transporter further comprising a first horizontal stabilizer and a second horizontal stabilizer;
the first horizontal stabilizer and the second horizontal stabilizer being adjacently connected to the orbiter support structure;
the first horizontal stabilizer and the second horizontal stabilizer being terminally positioned on the orbiter support structure; and
the first horizontal stabilizer and the second horizontal stabilizer being positioned opposite each other across the orbiter support structure.

6. The orbiter launch system as claimed in claim 5 further comprises:
the first vertical stabilizer being adjacently connected to the first horizontal stabilizer opposite the orbiter support structure; and
the second vertical stabilizer being adjacently connected to the second horizontal stabilizer opposite the orbiter support structure.

7. The orbiter launch system as claimed in claim 5 further comprises:
the orbiter support structure comprising a main support truss; and
the first horizontal stabilizer and the second horizontal stabilizer being adjacently connected to the main support truss.

8. The orbiter launch system as claimed in claim 1 further comprises:
the launch system transporter further comprising a first wing, a second wing, and a plurality of engines;
the first wing and the second wing being adjacently connected to the fuselage;
the first wing and the second wing being positioned opposite each other across the fuselage; and
the plurality of engines being adjacently connected to the first wing and the second wing.

9. The orbiter launch system as claimed in claim 1 further comprises:
the launch system transporter further comprising a landing gear assembly; and
the landing gear assembly being adjacently connected to the fuselage opposite the orbiter support structure.

10. The orbiter launch system as claimed in claim 1 further comprises:
a booster rocket comprising a body tube and a nozzle;
the nozzle being terminally connected to the body tube;
the body tube being positioned within the orbiter support structure; and
the nozzle being positioned adjacent to the first vertical stabilizer and the second vertical stabilizer.

11. The orbiter launch system as claimed in claim 1 further comprises:
a space orbiter;
the space orbiter comprising a plurality of roller blocks; and the plurality of roller blocks being slidably engaged with the orbiter support structure.

12. The orbiter launch system as claimed in claim 11 further comprises:
the orbiter support structure comprising a plurality of stabilization rails; and
the plurality of roller blocks being slidably engaged with the plurality of stabilization rails.

13. The orbiter launch system as claimed in claim 1 further comprises:
a space orbiter;
the space orbiter comprising a plurality of locks; and
the plurality of locks engaging the orbiter support structure adjacent to first vertical stabilizer and the second vertical stabilizer.

14. The orbiter launch system as claimed in claim 13 further comprises:
the orbiter support structure comprising a plurality of stabilization rails; and
the plurality of locks terminally engaging the plurality of stabilization rails.

15. The orbiter launch system as claimed in claim 1 further comprises:
a space orbiter comprising a plurality of reversible seats;
the space orbiter being slidably engaged with the orbiter support structure; and
each of the plurality of reversible seats being is a first position, wherein each of the plurality of reversible seats is toggled to a second position when the space orbiter is disengaged from the orbiter support structure.

* * * * *